(12) United States Patent
Kusterer et al.

(10) Patent No.: US 7,469,255 B2
(45) Date of Patent: Dec. 23, 2008

(54) ENTRY POINTS FOR NAVIGATION OF HIERARCHICAL INFORMATION STRUCTURES

(75) Inventors: Stefan Kusterer, Nussloch (DE);
Eckart Liemke, Heidelberg (DE);
Gerhard Bosch, Reilingen (DE);
Juergen Heymann, Heidelberg (DE);
Bernhard Drittler, Walldorf (DE)

(73) Assignee: SAP AG, Walldorf (DE)

( * ) Notice: Subject to any disclaimer, the term of this patent is extended or adjusted under 35 U.S.C. 154(b) by 430 days.

(21) Appl. No.: 10/331,121

(22) Filed: Dec. 26, 2002

(65) Prior Publication Data

US 2003/0225781 A1 Dec. 4, 2003

Related U.S. Application Data

(60) Provisional application No. 60/346,407, filed on Dec. 28, 2001.

(51) Int. Cl.
*G06F 17/30* (2006.01)
(52) U.S. Cl. .................. 707/102; 707/100; 707/103
(58) Field of Classification Search .............. 707/100, 707/102, 10; 709/224, 201, 202
See application file for complete search history.

(56) References Cited

U.S. PATENT DOCUMENTS

| | | | |
|---|---|---|---|
| 5,001,628 A | 3/1991 | Johnson et al. | |
| 6,128,655 A | 10/2000 | Fields et al. | |
| 6,470,344 B1 * | 10/2002 | Kothuri et al. | 707/100 |
| 6,578,078 B1 * | 6/2003 | Smith et al. | 709/224 |

FOREIGN PATENT DOCUMENTS

| | | |
|---|---|---|
| EP | 0994425 A2 | 4/2000 |
| WO | WO 01/33435 | 5/2001 |

OTHER PUBLICATIONS

May, "Integration of XML Data in XpathLog", *Caise Workshop Data Integration Over the Web*, Online! Interlaken, Switzerland, Retrieved from the Internet: URL:http://www.dbis.informatik.uni-goettingen.de/Publics/01/caise-2001.ps, retrieved on Oct. 15, 2003.

Gershman, "Implementation of Binary Trees", tutorial, Online! Nov. 10, 2000, retrieved from the Internet: URL:http://www.ece.mcmaster.ca/lgershman/coe2si4_tut7.pdf retrieved on Oct. 15, 2003! Section "Combining two subtrees into a single tree".

\* cited by examiner

*Primary Examiner*—Don Wong
*Assistant Examiner*—Sheree N Brown
(74) *Attorney, Agent, or Firm*—Mintz, Levin, Cohn, Ferris, Glovsky and Popeo P.C.

(57) ABSTRACT

Systems and techniques to generate a virtual hierarchy for navigating in and between object hierarchies. In general, in one implementation, the technique includes: flagging nodes in one or more object hierarchies as entry points and generating a virtual hierarchy including a virtual root and the nodes flagged as entry points depend directly from the virtual root.

19 Claims, 14 Drawing Sheets

ENTRY POINTS FOR NAVIGATION OF HIERARCHICAL INFORMATION STRUCTURES

CROSS REFERENCE TO RELATED APPLICATIONS

This application claims the benefit of priority from the U.S. Provisional Application entitled "PORTAL CONTENT DELIVERY", filed Dec. 28, 2001, Provisional Application Ser. No. 60/346,407, the disclosure of which is incorporated by reference.

BACKGROUND

The following description relates to information structures used in computer systems, for example, entry points for navigation of hierarchical information structures.

Computer systems may organize data in object hierarchies. An object hierarchy may have a tree structure. The tree may include a number of interdependent nodes. The nodes may represent objects such as files, documents, folders, applications, etc. A folder may contain other objects. The folder containing the objects is referred to a parent node and the objects it contains are called child nodes.

Object hierarchies can become extremely complex, especially as software complexity and the memory capacity of computer systems increase. Navigation of a hierarchy may become more difficult for a user as the hierarchy becomes more complex.

SUMMARY

The present application teaches generating a virtual hierarchy from one or more object hierarchies by flagging nodes in the hierarchies as "entry points." The present inventors recognized that conventional navigation structures do not enable users to combine distinct object hierarchies in a flexible manner. Accordingly, the inventors recognized the potential advantages of providing entry points into the distinct hierarchies and generating a virtual hierarchy utilizing these entry points.

In one aspect, nodes in two object hierarchies are flagged as entry points to those hierarchies. A virtual hierarchy is then built under a virtual root. The entry points depend directly from the virtual root in the virtual hierarchy. The structure above the entry points in the object hierarchies are not in the virtual hierarchy, but the structure below the entry points in the virtual hierarchy is identical to those of the object hierarchies.

The virtual node and entry point flags may be stored in a persistent manner, but the virtual hierarchy may be generated at run-time. An entry point module may first identify the nodes identified as entry points, e.g., by searching the object hierarchies. A navigation module may then generate a virtual tree including the virtual root, with the entry points depending directly from the virtual hierarchy.

In an embodiment, the entry point flags may include attributes, such as a precedence attribute. The navigation module may organize the nodes flagged as entry points in the virtual hierarchy according to their precedence values. The attributes may also include a merge indicator. Entry points with the same merge indicator are merged in the virtual hierarchy, i.e., a new node including the children of the merged entry points replaces the merged entry points.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to navigation of object hierarchies in computer systems.

Figure 1:
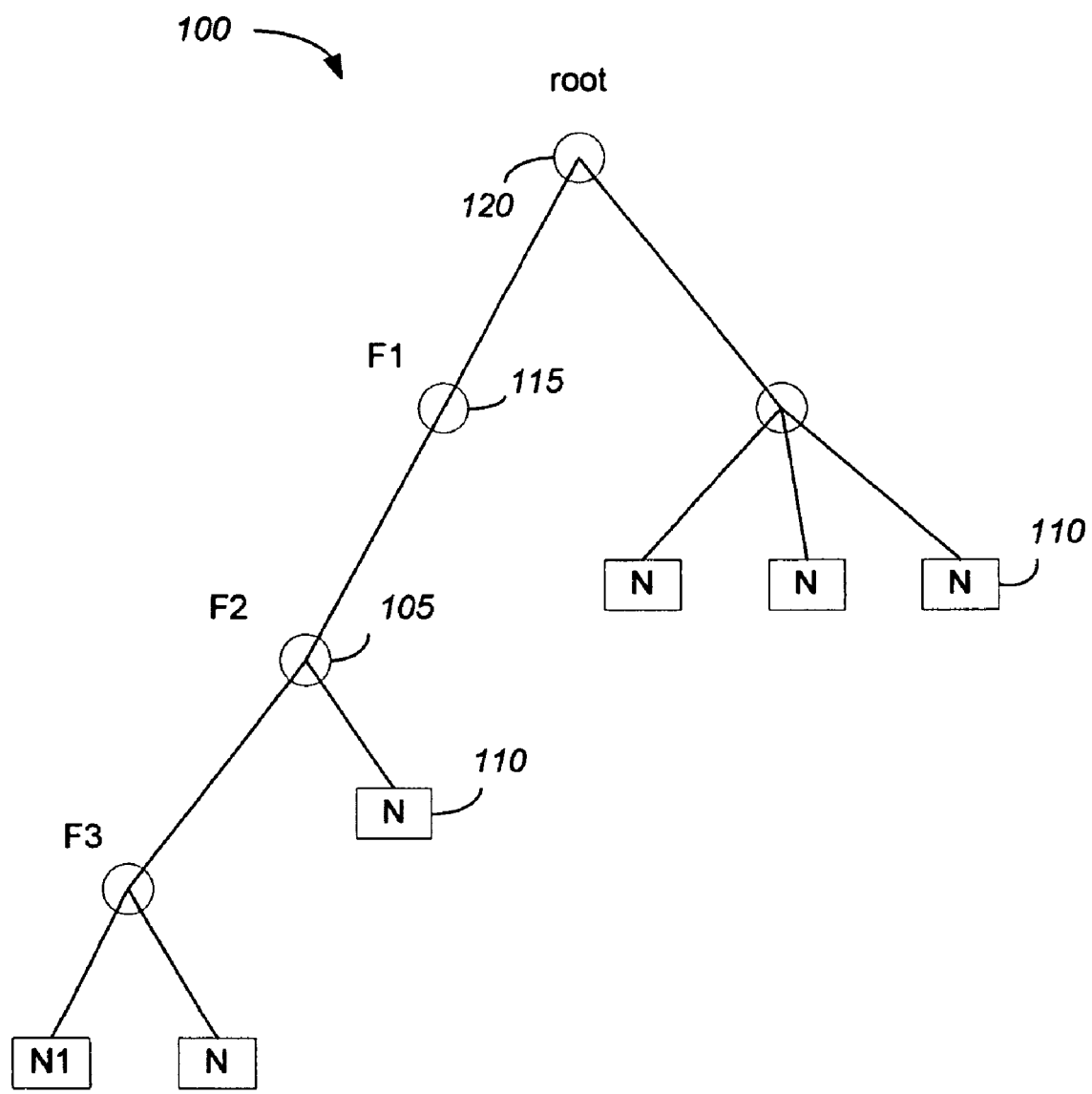
FIG. 1 shows a block diagram of an object hierarchy.

FIG. 1 illustrates an object hierarchy 100 representative of an information structure in a computer system. The object hierarchy may have a tree structure with many nodes. The nodes may represent objects such as files, documents, folders, applications, etc.

A node 105 in the hierarchy may have depending nodes 110, which are lower in the hierarchy. The node 105 is referred to as a parent node, and the nodes 110 depending from the parent node are referred to as child nodes, or that parent's children. The parent node 105 may be a child node of another node 115 higher in the hierarchy. In many systems, parent nodes are folders (also called directories).

The top node in the object hierarchy is referred to as the root. A node in the hierarchy may be designated by its root and all intervening parent nodes, i.e., the node N1 in FIG. 1 may have a designation in the form of "root/F1/F2/F3/N1." A website is an example of an information structure that may be organized as an object hierarchy. Objects in the hierarchy may be pages and files stored at the website's server. The root for the hierarchy may be the URL (Uniform Resource Locator) for the website. A document available at the website may be designated by the address, "http://www.root.net/page1/page2/document.htm."

A user of the computer system may access a node using the node's particular designation. However, if the user does not know the node's designation, the user may need to navigate through the hierarchy to locate the node. The user may also navigate the hierarchy when searching or browsing objects in the hierarchy. Navigation may be difficult in large and complex object hierarchies. Furthermore, it may be desirable to combine two or more object hierarchies. However, the combined hierarchy will be a larger structure which is more difficult to navigate than the component hierarchies.

In an embodiment, a virtual hierarchy may be created from one or more hierarchies. The virtual hierarchy may provide a flexible way to define a navigation structure suitable for a particular purpose or user. The virtual hierarchy may also provide a flexible way to combine distinct object hierarchies.

Figure 2:
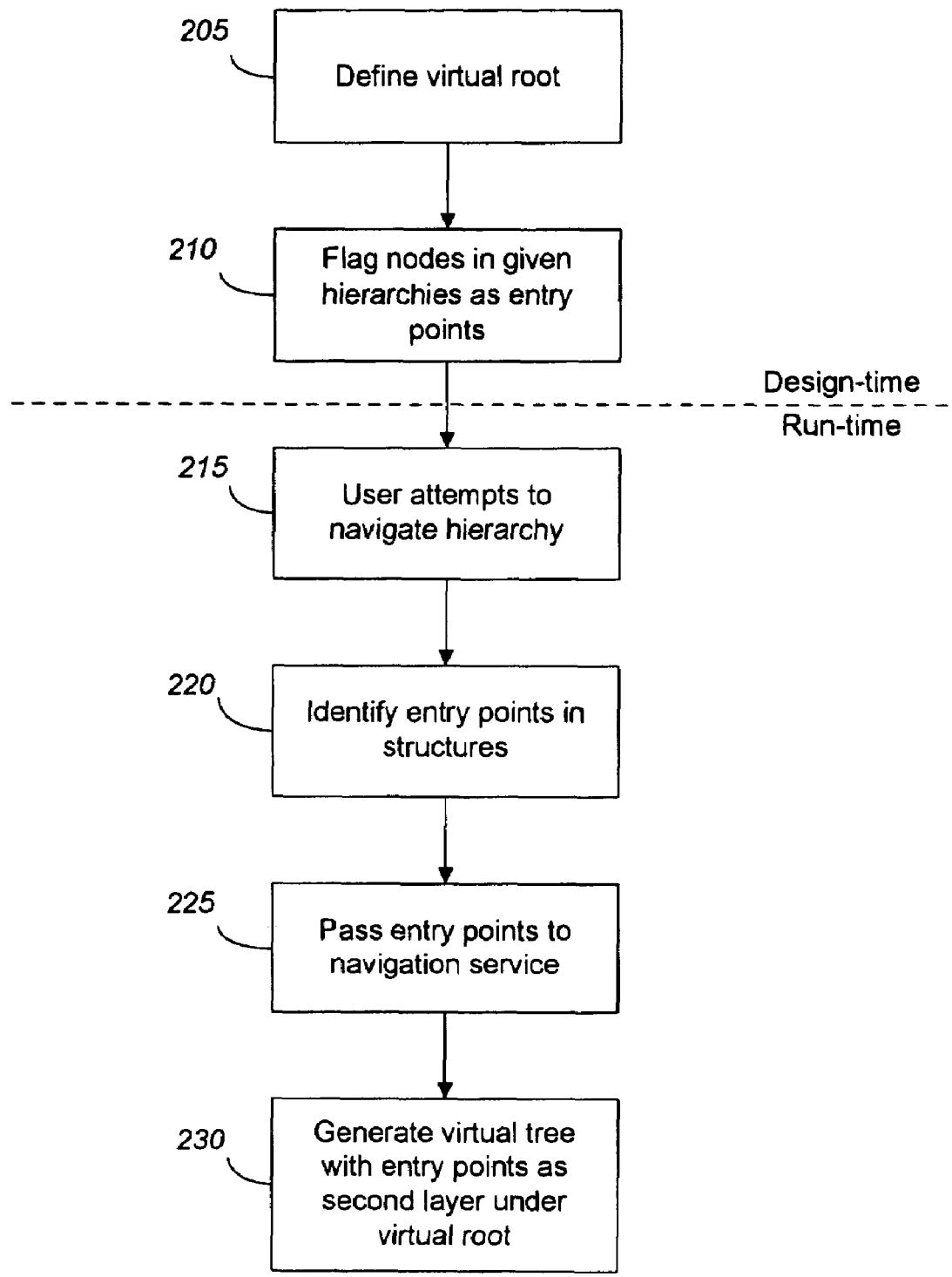
FIG. 2 is a flowchart showing a process for generating a virtual hierarchy.
Figure 3:
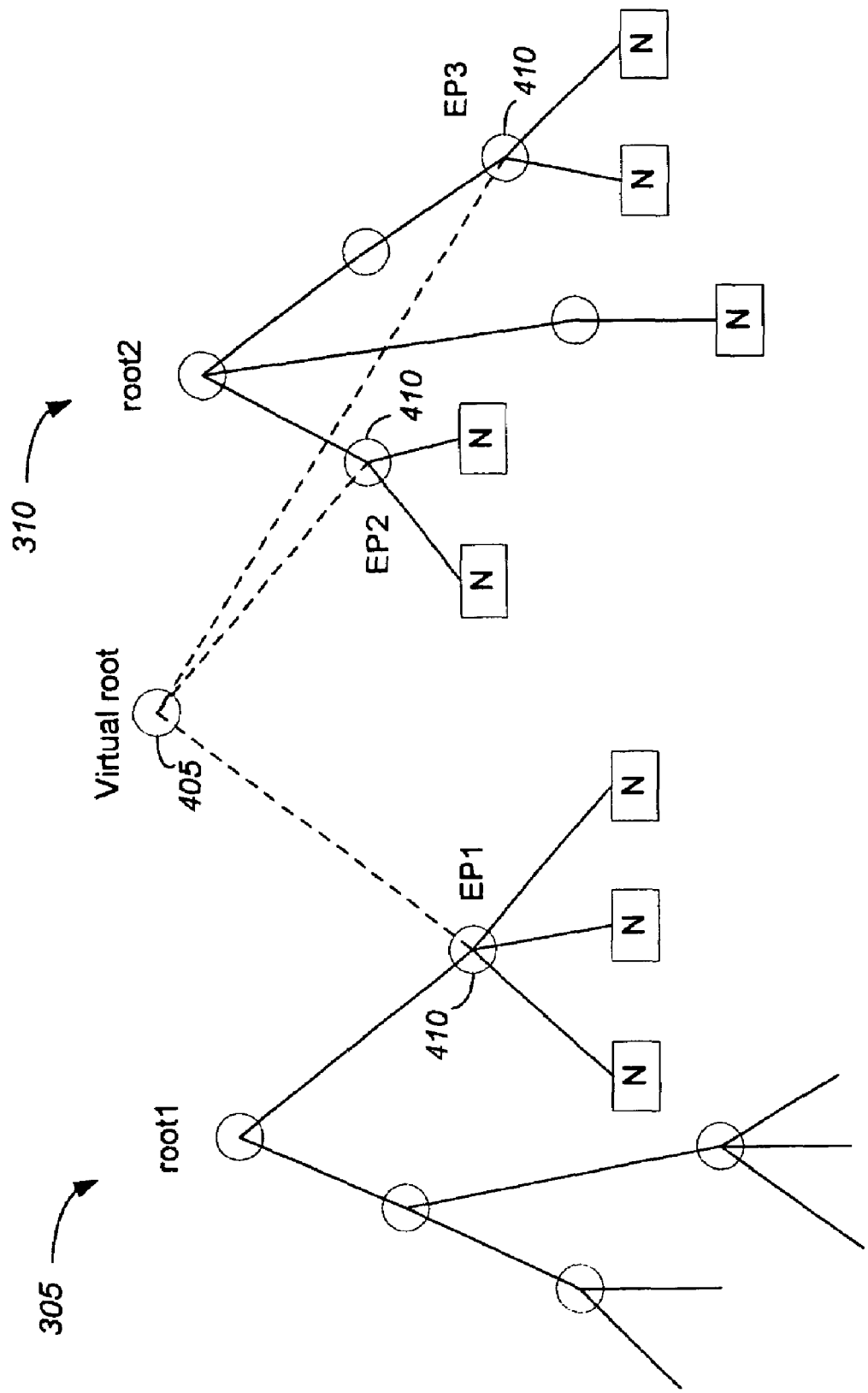
FIG. 3 is a block diagram of two object hierarchies.
Figure 4:
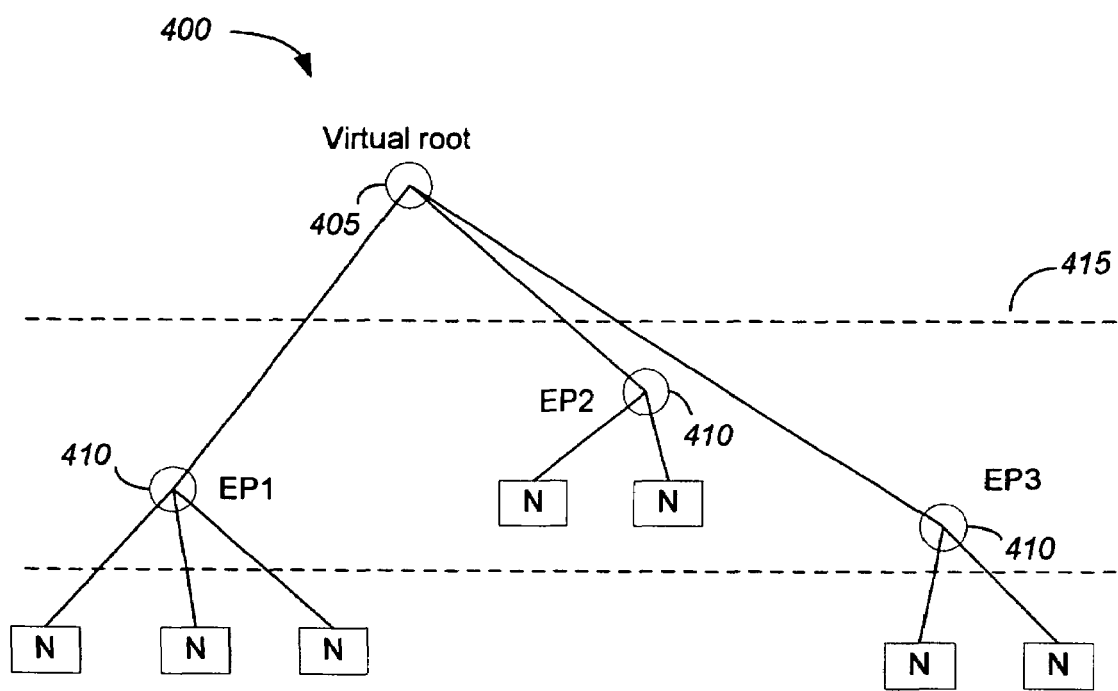
FIG. 4 is a block diagram of a virtual hierarchy generated from the two object hierarchies shown in FIG. 3.

FIG. 2 is a flowchart describing a technique 200 for creating a virtual hierarchy 400, shown in FIG. 4. FIG. 3 shows the two object hierarchies 305 and 310 from which the virtual hierarchy 400 derives.

Figure 5:
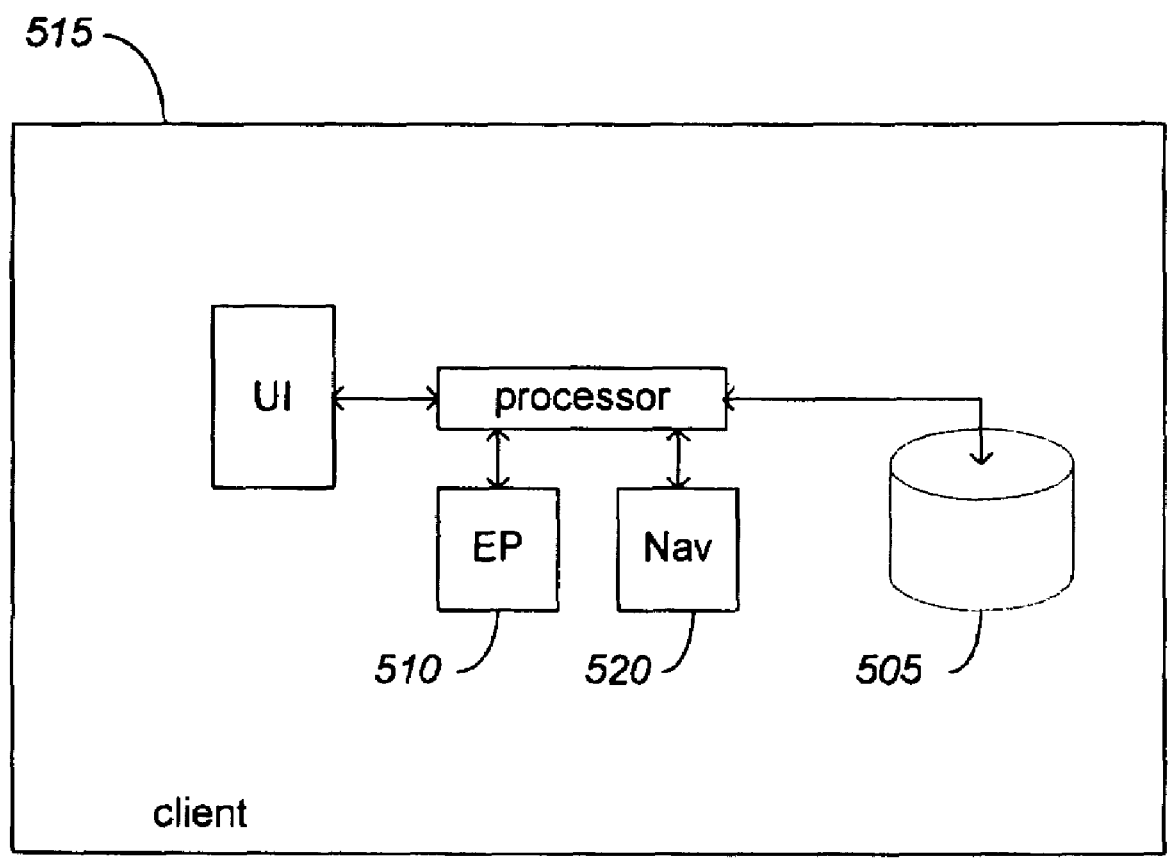
FIG. 5 is a block diagram of a client including modules for generating a virtual hierarchy.

The virtual root 405 may be defined for the virtual hierarchy during development (block 205). Nodes in the two hierarchies are flagged as entry points 410 (block 210). The flags may define attributes, such as a precedence attribute, e.g., an order number. The virtual root and entry point flags may be stored in a persistent manner, e.g., in a database 505 (shown in FIG. 5), along with the object hierarchies 305 and 310.

The virtual hierarchy may be generated at run-time as the user attempts to navigate the structures (block 215). An entry point module 510 at the client 515 searches the hierarchies for the entry points (block 220). The entry point module 510 may pass the entry points to a navigation module 520 (block 225). The navigation module may use the entry points to generate the virtual tree 400 under the virtual root 405 (block 230). The immediate descendants of the virtual root are those nodes from the different hierarchies marked as entry points. The order of the entry points in the combined tree, i.e., the virtual hierarchy, may be defined by the precedence attribute. Below each entry point the structure in the combined tree follows the structure of the persistent hierarchies 305 and 310, as shown in FIG. 4. Thus, the nodes marked as entry points become nodes on the second level 415 of the combined tree. Nodes in the given trees above an entry point, e.g., nodes 315 and 320 (FIG. 3) are not contained in the virtual hierarchy 400.

Figure 6:
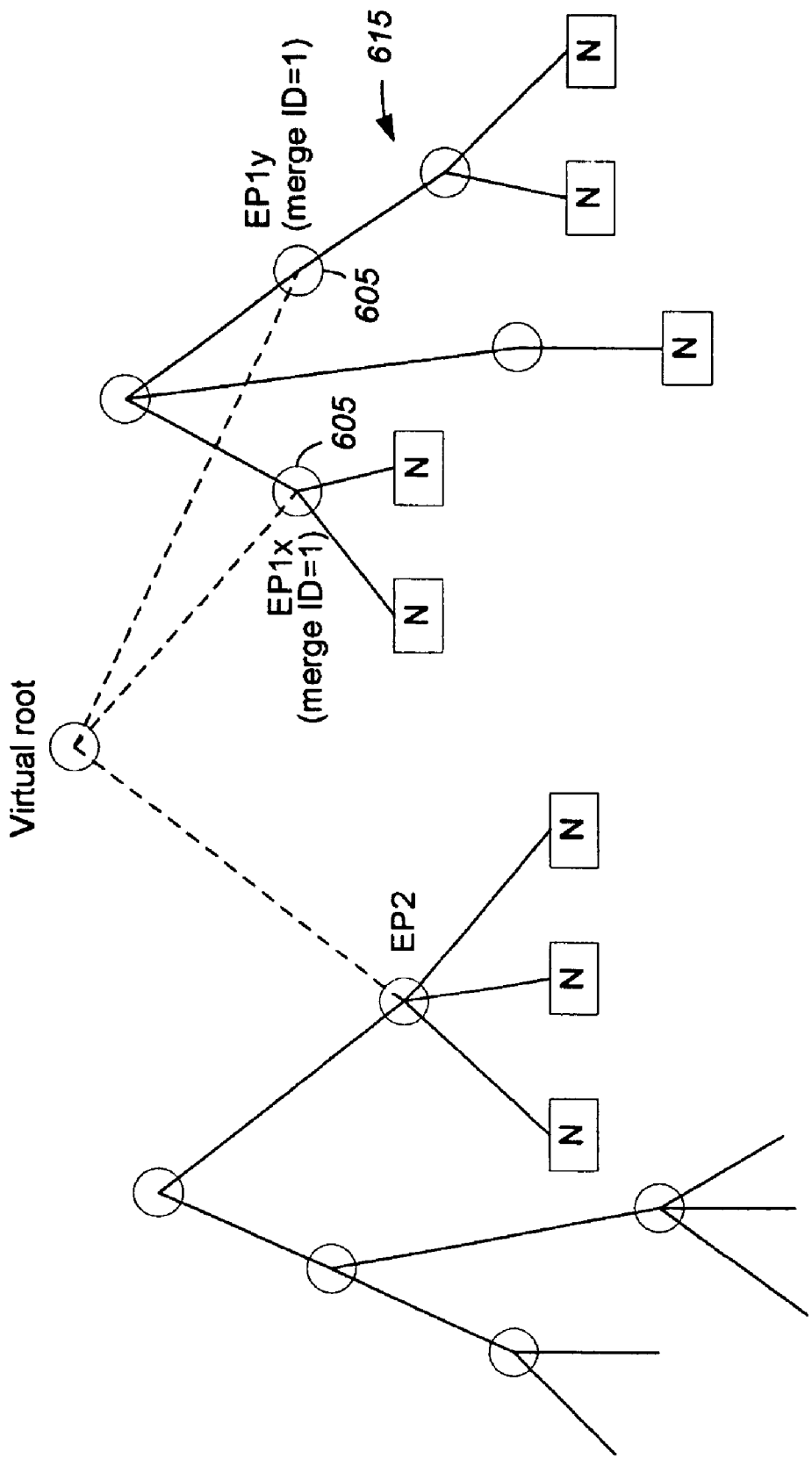
FIG. 6 is a block diagram of two object hierarchies.
Figure 7:
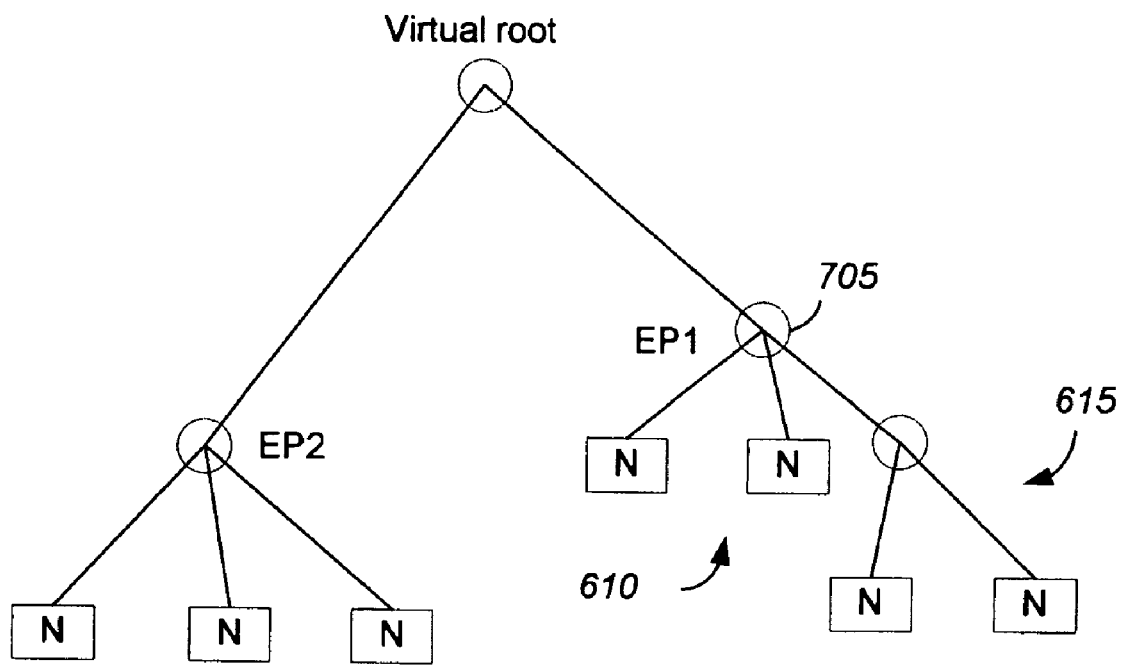
FIG. 7 is a block diagram of a virtual hierarchy including merged entry points.

In an embodiment, the entry point flag may include a merge ID. Two or more nodes 605 may be flagged with an entry point flag that contains the same merge ID, as shown in FIG. 6. In the virtual hierarchy, the two nodes 605 will be merged into one entry point 705, as shown in FIG. 7. The child nodes of both nodes 610 will be combined under the entry point 705 in the virtual hierarchy. The precedence attribute may be used as the merge ID.

Figure 8:
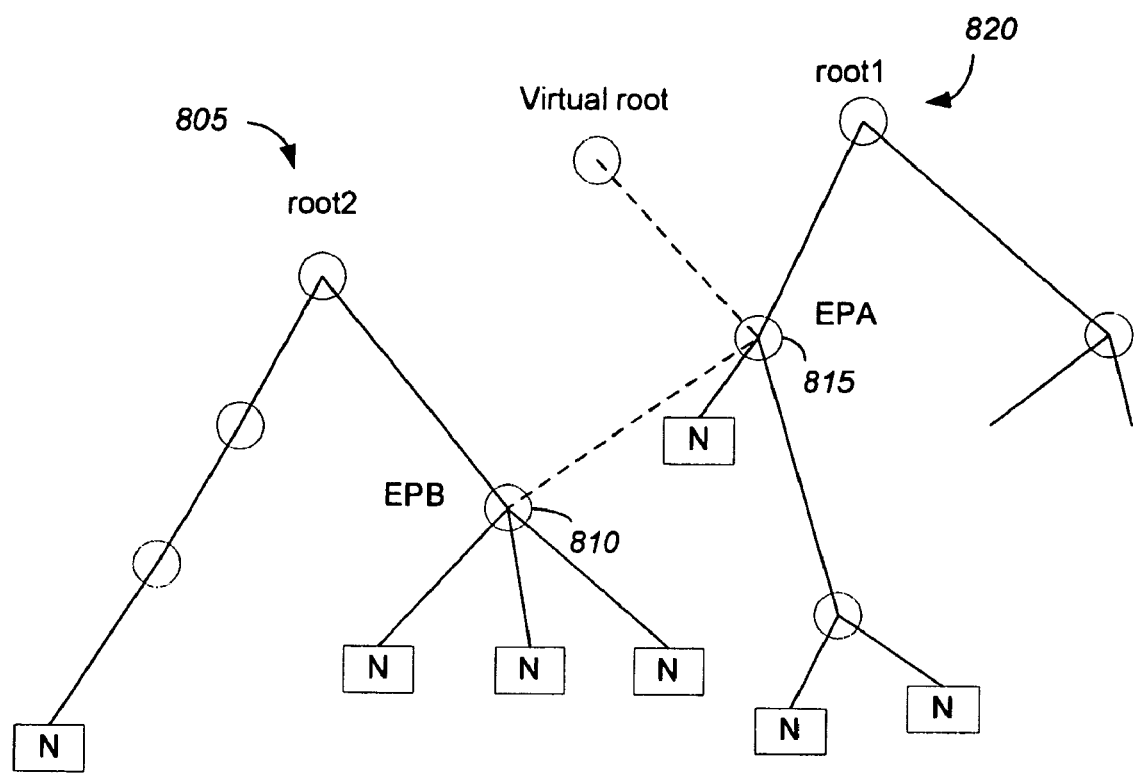
FIG. 8 is a block diagram of two object hierarchies.
Figure 9:
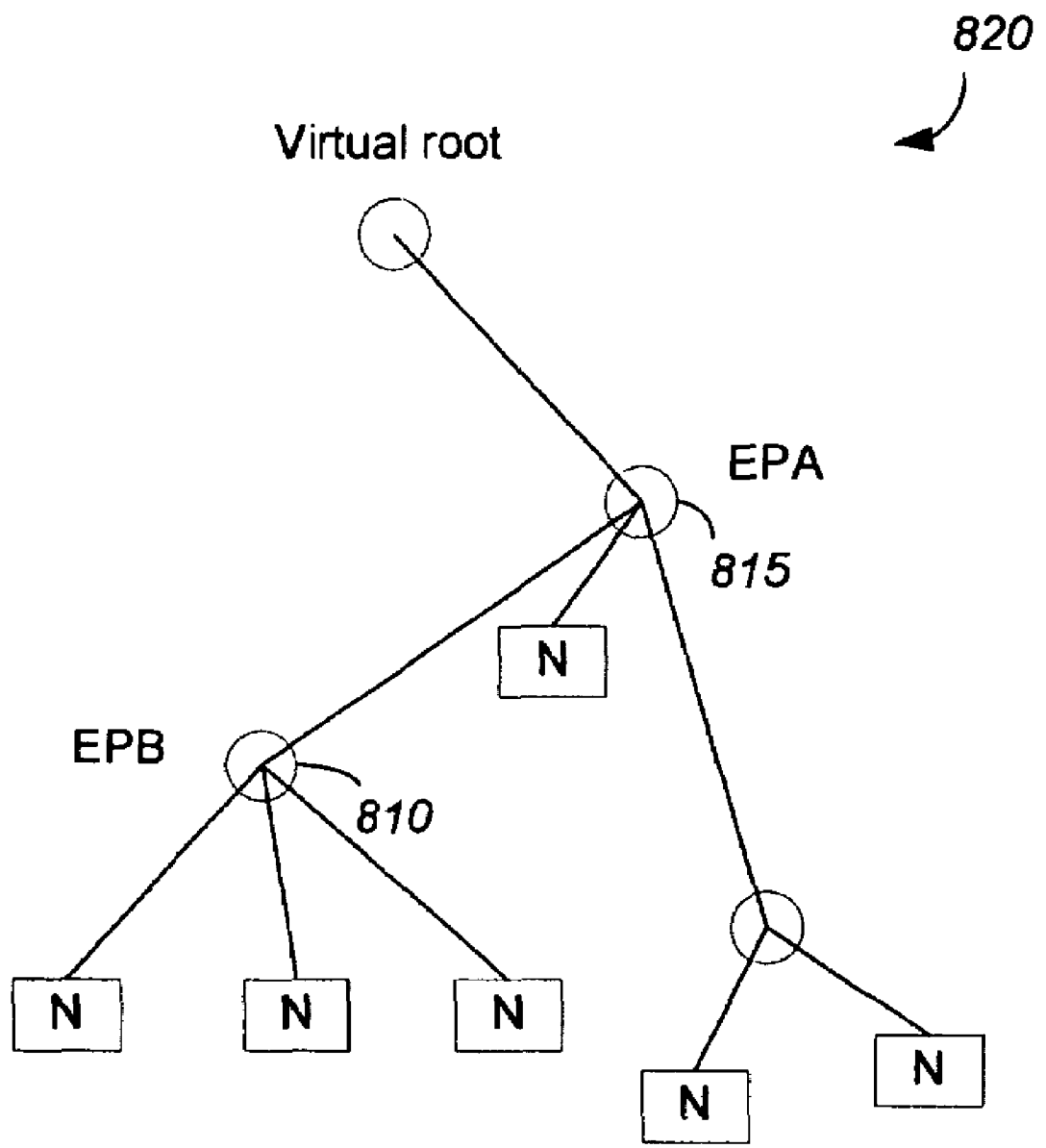
FIG. 9 is a block diagram of a virtual hierarchy including an entry point with a subordinate entry point.

In an embodiment, an entry point may be a child of another entry point in the virtual hierarchy. For example, a node in an object hierarchy 805 may be marked as a subordinate entry point 810 to a node marked as an entry point 815 in another object hierarchy 820, as shown in FIGS. 8 and 9. This dependency may be identified in an attribute in the entry point flag. Alternatively, entry point dependencies may be stored in the entry point module.

Figure 10:
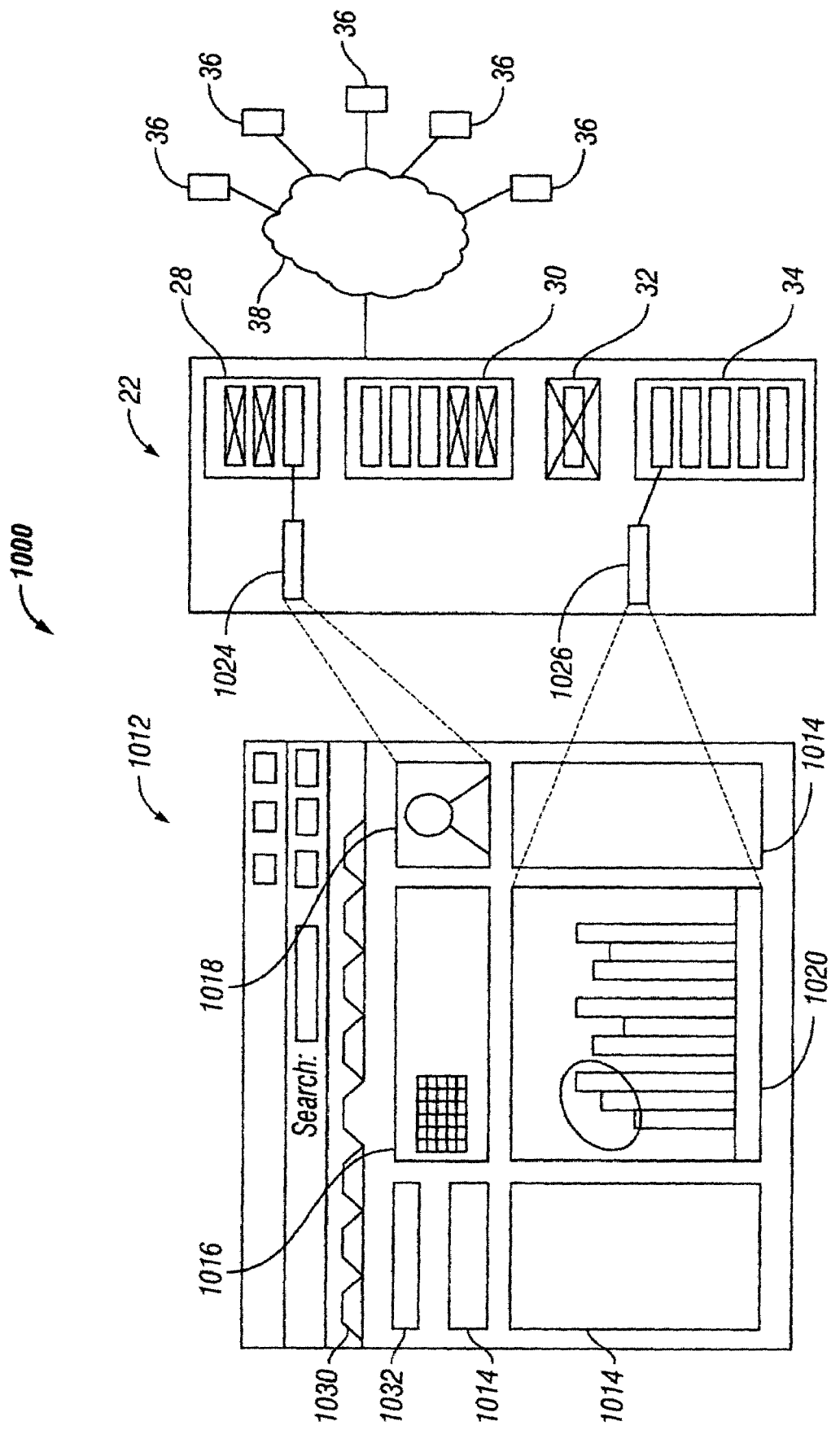
FIG. 10 is a block diagram of a system including a portal.
Figure 11:
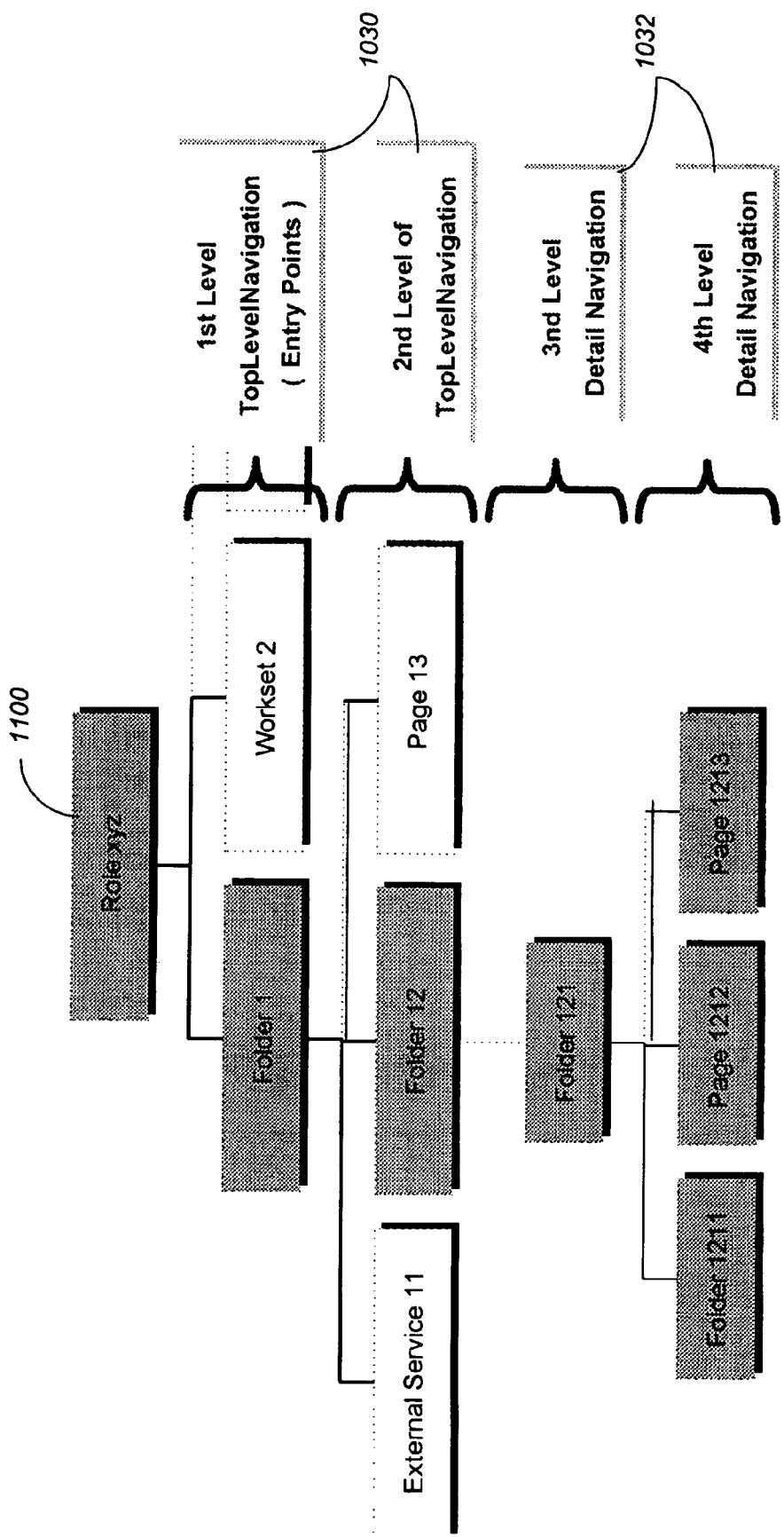
FIG. 11 is a block diagram of a navigation structure.

In an embodiment, a virtual hierarchy may be used to define a navigation structure for a user of a portal. FIG. 10 is a block diagram of a system 1000 for managing communications between a computer user and a variety of collaboration services. In the pictured example, the computer user interacts with the system 1000 through a portal. The portal is a central interface that provides the user with access to various resources and information, including information that is stored in different formats on different computer systems. In addition, the portal may provide updated information in real-time or near real-time, so that as the underlying data changes, the information displayed in a portal page 1012 also changes. The portal page 1012 provides this information through various integrated views (also known as "iViews") 1014-1026.

The user navigates on entries in the title area 1030 (e.g., "top-level" navigation) and content area 1032 (e.g., "detailed" navigation) of the portal page 1012. The entries used for navigation may come from the roles assigned to the user.

Figure 12:
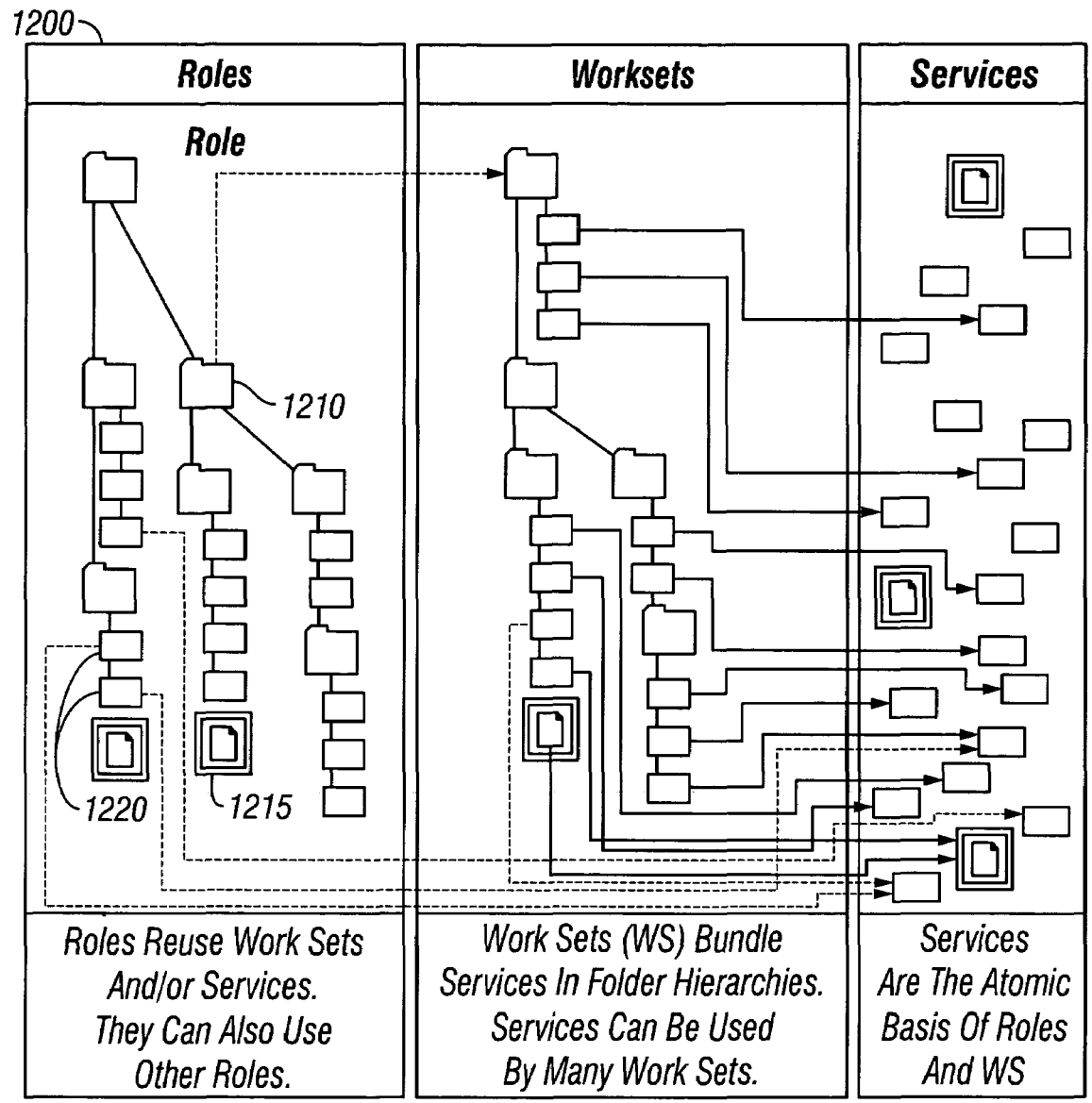
FIG. 12 is a block diagram of a role hierarchy.

A role is an object hierarchy that corresponds to a role which may be assigned to a user, e.g., "manager", "engineer", or "human resources administrator." FIG. 12 shows the structure of an exemplary role hierarchy. The nodes in the role hierarchy may include folders 1205, worksets 1210, pages, 1215 and services 1220, which may be useful to users assigned that role.

Figure 13:
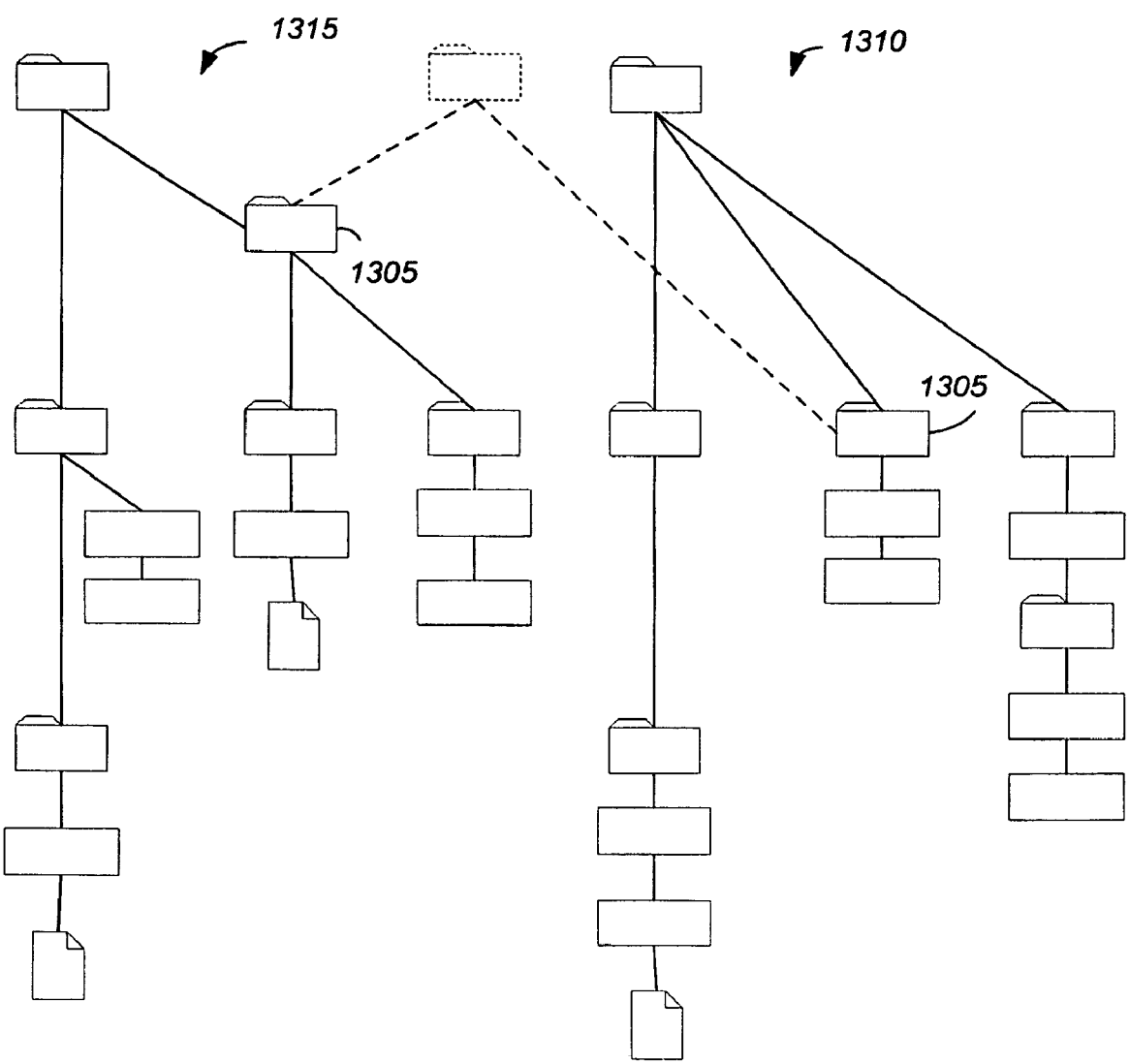
FIG. 13 is a block diagram of two role hierarchies.
Figure 14:
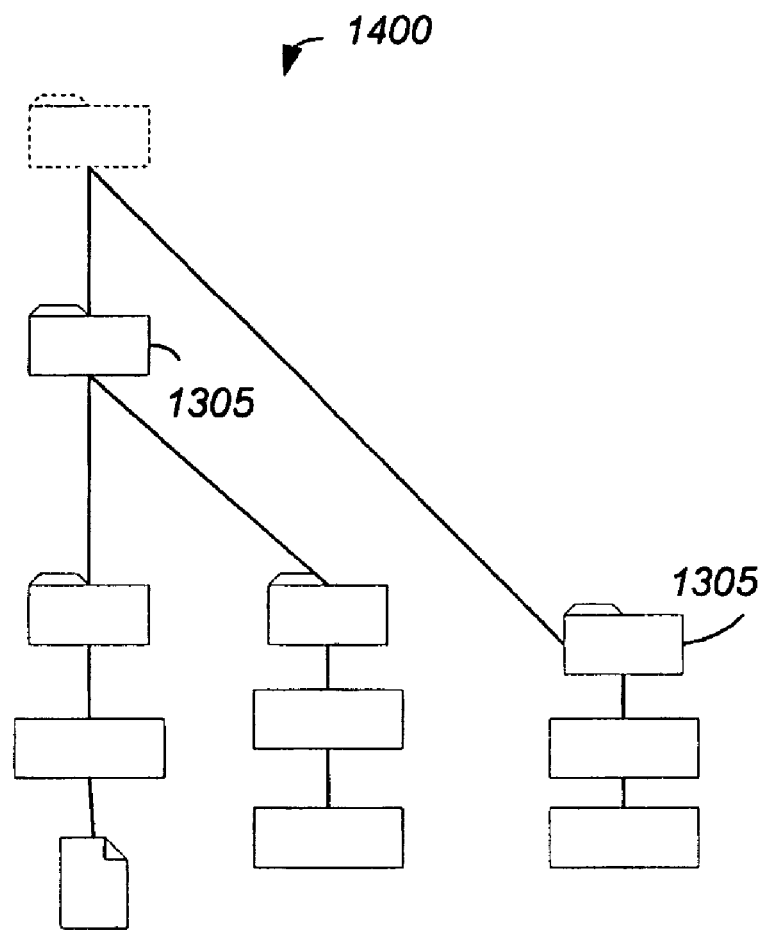
FIG. 14 is a block diagram of a virtual role hierarchy.

Role hierarchies may be pre-defined in the persistent layer. The user's actual role may not correspond directly to any of the pre-defined roles. Accordingly, the user may be assigned more than one role. However, the user may not need access to all of the objects in the various role hierarchies. Entry points 1305 may be used to create a combined tree 1400 with a navigation structure that more closely matches the user's needs, as shown in FIGS. 13 and 14. The entry points 1305 in the role hierarchies 1310 and 1315 may be defined by an administrator. The user may personalize the virtual hierarchy by changing the precedence values and dependencies of the entry points.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss defining entry points in distinct object hierarchies and creating a navigation structure comprising a virtual hierarchy. The logic flow depicted in FIG. 2 does not require the particular order shown, or sequential order, to achieve desirable results. For example, defining the virtual root and flagging entry points may be performed at many different places within the overall process. In certain implementations, multitasking and parallel processing may be preferable.

Other embodiments may be within the scope of the following claims.

What is claimed is:

1. A computer-implemented method for generating a virtual hierarchy, the computer-implemented method comprising:

assigning a first merge identifier to a first node in a first object hierarchy and a second merge identifier to a second node in a second object hierarchy, the first object hierarchy comprising a first portion that comprises the first node and a first descendant node that is associated with the first node, the second object hierarchy comprising a second portion that comprises the second node and a second descendant node that is associated with the second node;

flagging the first merge identifier as a first entry point and the second merge identifier as a second entry point;

generating the virtual hierarchy by combining, using the first and second merge identifiers, the first portion of the first object hierarchy with the second portion such that the first node and the second node depend from a virtual root that comprises a Uniform Resource Locator of a portal; and storing the virtual root assigned to the virtual hierarchy to configure at the portal navigation among nodes in the first portion and the second portion, the navigation between the first portion of the first object hierarchy and the second portion of the second object hierarchy using the corresponding first and second merge identifiers of the virtual hierarchy.

2. The computer-implemented method of claim 1, further comprising navigating between the first node and the second node via the virtual root in the virtual hierarchy, the portal being implemented as a web site.

3. The computer-implemented method of claim 1, wherein the first identifier and the other identifier are entry point flags, and further comprising identifying the entry point flags in the first object hierarchy and in the second hierarchy prior to generating the virtual hierarchy.

4. The computer-implemented method of claim 1, wherein assigning the first identifier comprises assigning a first precedence value, assigning the second identifier comprises assigning a second precedence value, and generating comprises organizing the first node and the second node in the virtual hierarchy in response to said precedence values.

5. The computer-implemented method of claim 1, wherein the first node depends from a third node in the first object hierarchy.

6. The computer-implemented method of claim 1 further comprising: associating the virtual hierarchy to a role of a user to enable navigation based on the role.

7. The computer-implemented method of claim 1, wherein the nodes comprise documents and files.

8. An apparatus comprising:

a storage device operative to store a plurality of object hierarchies, at least two of said object hierarchies including nodes flagged as entry points using merge identifiers to configure portions of the object hierarchies to be combined to generate a virtual hierarchy to configure at a portal navigation among objects comprising documents and files, at least one of said flagged nodes having at least one corresponding descendant node;

an entry point module operative to identify the nodes flagged as entry points; and a navigation module operative to generate the virtual hierarchy including a virtual root comprising a Uniform Resource Locator of the portal storing the nodes, a plurality of nodes flagged as entry points from the at least two of said object hierarchies depending directly from the virtual root assigned to the virtual hierarchy to configure navigation between portions of the virtual hierarchy, and the corresponding at least one descendant node descending from the plurality of nodes flagged as entry points.

9. The apparatus of claim 8, wherein two of the nodes flagged as entry points have one or more child nodes.

10. The apparatus of claim 9, wherein the navigation module is operative to merge said two of the nodes flagged as entry points such that the virtual hierarchy includes a single node including the child nodes of said two nodes flagged as entry points.

11. A computer-implemented method comprising:

defining a virtual root comprising a Uniform Resource Locator of a portal storing nodes;

flagging nodes in each of two or more object hierarchies as entry points using merge identifiers to configure portions of the object hierarchies to be combined to generate a virtual hierarchy to configure at the portal navigation among objects comprising documents and files, at least one of said flagged nodes having at least one corresponding descendant node;

identifying the flagged nodes as entry points; and combining the two or more object hierarchies to form a virtual hierarchy, the virtual hierarchy including the virtual root as a root node, a plurality of said flagged nodes identified as entry points depending directly from the root node, and the corresponding at least one descendant node descending from the plurality of nodes flagged as entry points.

12. The computer-implemented method of claim 11, further comprising navigating between a plurality of said nodes flagged as entry points in the virtual hierarchy.

13. An article of manufacture comprising a machine-readable medium storing instructions for generating a virtual hierarchy to configure at a portal navigation among nodes comprising documents and files, the nodes organized into a first object hierarchy and a second object hierarchy, the instructions configuring one or more machines to perform operations comprising:

assigning a first merge identifier to a first node in a first object hierarchy, the first merge identifier flagged as a first entry point to configure a first portion of the first object hierarchy to be combined with another portion to generate a virtual hierarchy to configure at a portal navigation among objects comprising documents and files, the first node having at least one corresponding descendant node;

assigning a second merge identifier to a second node in a second object hierarchy, the second merge identifier flagged as a second entry point to enable a second portion of the second object hierarchy to be combined to generate the virtual hierarchy, the second node having at least one corresponding descendant node; and combining, using the first and second merge identifiers, the first portion of the first object hierarchy including the first node and at least one associated descendant node with the second portion of the second object hierarchy including the second node and at least one associated descendant node to generate the virtual hierarchy, wherein the first node and the second node depend directly from a virtual root comprising a Uniform Resource Locator of the portal, the virtual root assigned to the virtual hierarchy to configure at the portal navigation among nodes comprising documents and files, the navigation between the first portion of the first object hierarchy and the second portion of the second object hierarchy using the corresponding first and second merge identifiers of the virtual hierarchy.

14. The article of claim 13, further comprising instructions operable to cause the one or more machines to navigate between the first node and the second node via the virtual root in the virtual hierarchy.

15. The article of claim 13, wherein the first identifier and the second identifier are entry point flags, and further comprising instructions operable to cause the one or more machines to identify the entry point flags in the first object hierarchy and in the second object hierarchy prior to generating the virtual hierarchy.

16. The article of claim 13, wherein said assigning the first identifier comprises assigning a first precedence value, and wherein said assigning the second identifier comprises assigning a second precedence value, and wherein said generating comprises organizing the first node and the second node in the virtual hierarchy in response to said precedence values.

17. The article of claim 13, wherein the first node depends from a third node in the first object hierarchy.

18. An article of manufacture comprising a machine-readable medium storing instructions configuring one or more machines to perform operations comprising:

defining a virtual root comprising a Uniform Resource Locator of the portal storing the nodes;

flagging nodes in each of two or more object hierarchies as entry points using merge identifiers to configure portions of the object hierarchies to be combined to generate a virtual hierarchy to configure at the portal navigation among objects comprising documents and files, at least one of said flagged nodes having at least one corresponding descendant node;

identifying the flagged nodes as entry points; and combining the object hierarchies to generate a virtual hierarchy including the virtual root as a root node and a plurality of said flagged nodes identified as entry points depending directly from the root node, and the corresponding at least one descendant node descending from the plurality of nodes flagged as entry points.

19. The article of claim 18, further comprising instructions operable to cause the one or more machines to navigate between a plurality of said nodes flagged as entry points in the virtual hierarchy.

* * * * *